UNITED STATES PATENT OFFICE.

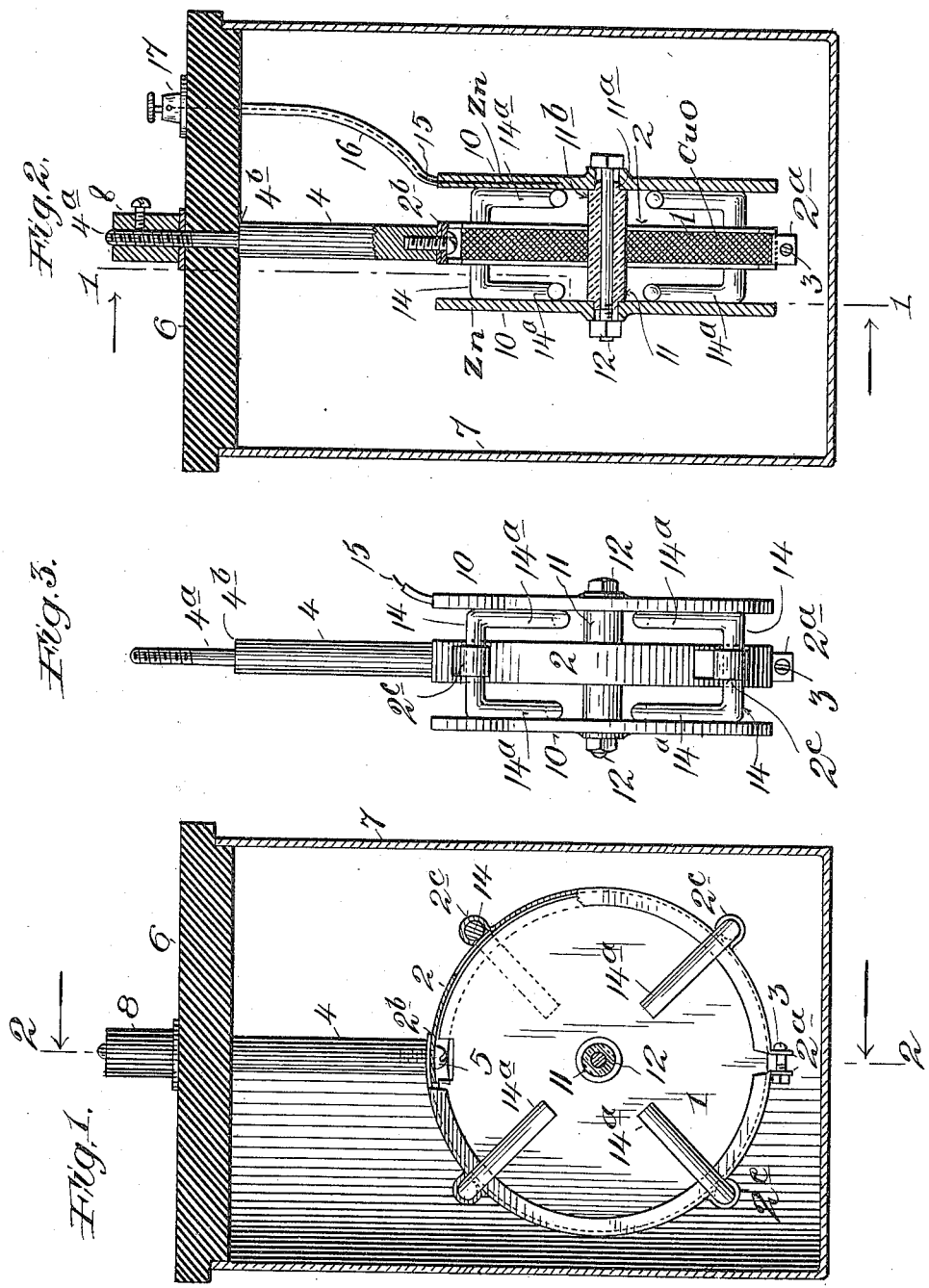

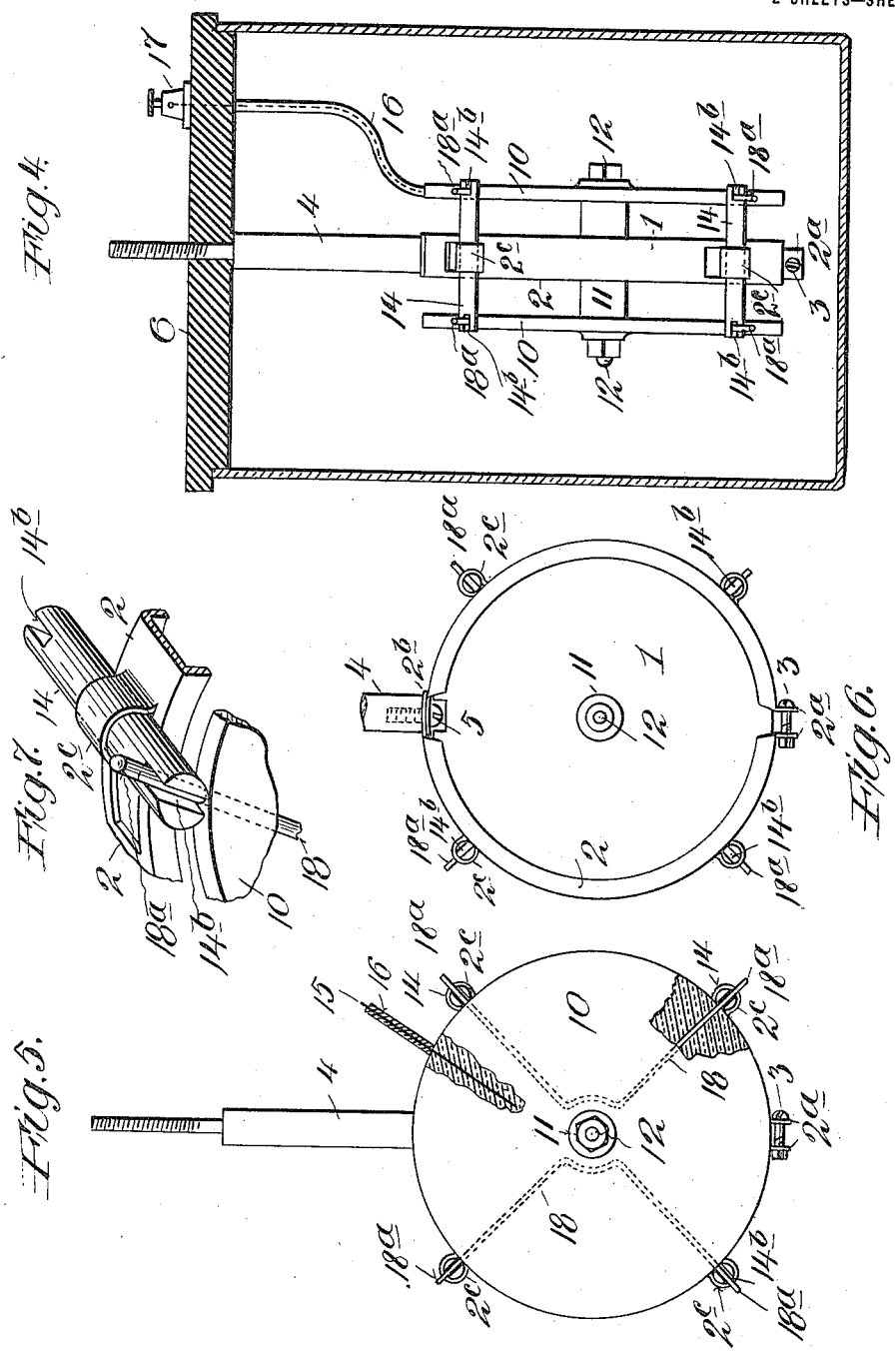

GEORGE A. LUTZ, OF PLAINFIELD, NEW JERSEY.

PRIMARY ELECTRIC BATTERY.

1,161,322.   Specification of Letters Patent.   Patented Nov. 23, 1915.

Application filed December 6, 1909. Serial No. 531,485.

*To all whom it may concern:*

Be it known that I, GEORGE A. LUTZ, a citizen of the United States, and resident of Plainfield, in the county of Union and State of New Jersey, have invented certain new and useful Improvements in Primary Electric Batteries, of which the following is a specification.

My invention relates to improvements in primary electric batteries, and particularly to the class of batteries employing a negative element comprising cupric oxid compressed to plate form, and one or more zincs for the positive element.

The object of my invention is to maintain the positive and negative elements in proper relation to each other; to prevent danger of said elements coming into contact with each other; to enable the ready replacement of the elements when required; and generally to simplify and improve such class of batteries.

In carrying out my invention I provide a compressed plate of suitable material for the negative electrode, and I attach to said plate one or more positive electrodes by means of suitable insulation, whereby one of the electrodes is supported by the other electrode. I also interpose between the positive and negative electrodes suitable insulation serving to prevent said electrodes from coming in contact and to maintain their relative spaced relation to each other.

My invention also comprises novel details of improvement that will be more fully hereinafter set forth and then pointed out in the claims.

Reference is to be had to the accompanying drawings forming part hereof, wherein, Figure 1 is a sectional view of a primary electric battery embodying my invention substantially on the line 1, 1, in Fig. 2; Fig. 2 is a section substantially on the line 2, 2, in Fig. 1; Fig. 3 is a detail edge view of the battery elements; Fig. 4 is a sectional view of a modification; Fig. 5 is a partly broken face view of the battery elements of Fig. 4; Fig. 6 is a detail face view of the negative element, and Fig. 7 is an enlarged detail view of part of the elements.

Similar numerals of reference indicate corresponding parts in the several views.

The numeral 1 indicates a negative element or electrode, shown in the form of a circular plate, which may be a well known compressed plate of cupric oxid.

At 2 is a frame or band surrounding electrode 1, and which may be made of channeled metal receiving the edges of said electrode. I have shown said frame as made in two main parts having ears $2^a$ connected together by suitable means, such as a bolt 3, the opposite ends of the two parts of the frame being suitably cut away at the sides so that the respective end portions $2^b$ may overlap and be attached to a metallic hanger or post 4, as by means of screw 5. The upper end of post 4 is shown provided with a reduced threaded portion $4^a$ providing a shoulder $4^b$ to fit against cover 6 of jar 7, a suitable nut or binding post 8 fitting upon the threaded end of post 4 holding said post firmly suspended from cover 6 and providing for attachment to a line wire.

One or more positive electrodes or zincs 10 are supported by and insulated from electrode 1 and located at a suitable distance from the side or sides of electrode 1. For this purpose I have shown an insulating block 11 extending transversely through and projecting from electrode 1, as by passing through an aperture therein, within which aperture said block may firmly fit, the electrodes or zincs 10 being attached to said block, for which purpose I have shown bolt 12 passing through bores in zincs 10 and block 11, and electrically connecting the zincs. Block 11 is shown provided with reduced end portions $11^a$, passing through corresponding holes in zincs 10 and providing shoulders $11^b$ against which said zincs are clamped by bolt 12, thereby serving to electrically connect said zincs and retain said zincs in proper position spaced from electrode 1. To further aid in keeping electrodes 10 spaced from electrode 1 and in proper relation thereto I provide electrode 1 with insulating blocks 14 extending outwardly into position for coaction with electrodes 10. Blocks 14 may be carried by electrode 1 in any suitable manner. I have shown said blocks as attached to frame 2. For this purpose I have shown said frame provided with tongues $2^c$ struck from the material thereof and folded over or around blocks 14 to hold the latter against frame 2, whereby said blocks are securely and detachably connected with said frame, and said blocks may be adjusted as required.

In Figs. 1, 2 and 3 I have shown insulating blocks 14 as provided with inwardly extending portions $14^a$ coacting with electrodes 10 to prevent said electrodes from swinging toward electrode 1. The inwardly extending portions 14ª of blocks 14, which may be of any desired length, serve as abutments for said electrodes as the latter are eaten away in use, so that if said electrodes become reduced in diameter the insulating extensions 14ª continue to coact with said electrodes. The conductor 15 for the positive electrodes may be attached to either of said electrodes in any suitable manner, but preferably by casting the metal of the electrode around the conductor. At 16 is an insulating protector, such as a rubber tube inclosing conductor 15. The conductor 15 may be connected with a binding post 17 upon cover 6 in well known manner. Instead of providing blocks 14 with extensions 14ª, I may provide electrodes 10 with extensions to coact with blocks 14 as shown in Figs. 4 to 6. In this case wires 18 are embedded in electrodes 10 so that the ends 18ª of said wires project from said electrodes and coact with insulating blocks 14, for which purpose I have shown the ends of blocks 14 provided with recesses 14ᵇ receiving the ends 18ª of wires 18, whereby electrodes 10 are kept spaced from engagement with electrode 1, and as electrodes 10 decrease in diameter during use the wires 18 remain in coaction with blocks 14 to keep electrodes 10 properly spaced from electrode 1.

While I have illustrated a practical embodiment of my invention, the same is not limited to the details and arrangements set forth, as changes may be made, within the scope of the appended claims, without departing from the spirit of my invention.

Having now described by invention what I claim is:—

1. Battery elements comprising a negative electrode, an insulating block passing through and projecting from opposite sides of said electrode, positive electrodes carried by the insulating block on opposite sides of the negative electrode, a bolt passing through said positive electrodes and insulation and electrically uniting said electrodes, and other insulation interposed between the positive and negative electrodes to retain them in position.

2. Battery elements comprising a negative electrode, insulation carried thereby, a positive electrode attached to said insulation, and one or more insulating pieces connected with said negative electrode and having an extension located between said electrodes and extending substantially parallel therewith.

3. Battery elements comprising a negative electrode, an insulating block extending on opposite sides thereof, electrodes attached to said block, and one or more insulating pieces connected with the negative electrode and having extensions extending substantially parallel to said electrodes and coacting with the positive electrodes.

4. Battery elements comprising a depolarizing plate, a frame attached thereto, an insulating block carried by said plate, one or more insulating pieces carried by said frame, and a positive electrode supported by and insulated from said plate.

5. Battery elements comprising a negative electrode, a frame attached thereto, a support for said frame, insulation carried by said frame, insulation carried by said plate, and a positive electrode carried by the last named insulation, and adjacent the first named insulation.

6. Battery elements comprising a depolarizing plate, a frame attached thereto, an insulating piece attached to and projecting on opposite sides of said frame, an insulating block carried by said plate, and a positive electrode attached to said insulation.

7. Battery elements comprising a depolarizing plate, a frame attached thereto, an insulating piece attached to and projecting on opposite sides of said frame and provided with inwardly projecting extensions, an insulating block carried by said plate, and electrodes carried by said block on opposite sides thereof and adjacent said extensions.

8. Battery elements comprising a depolarizing plate, a frame surrounding the same, said frame having a tongue, an insulator attached to said frame by said tongue and projecting from the frame, insulation carried by said plate, and an electrode attached to said insulation.

Signed at New York city, in the county of New York, and State of New York, this 3rd day of December, A. D. 1909.

GEORGE A. LUTZ.

Witnesses:
T. F. BOURNE,
MARIE F. WAINRIGHT.

Copies of this patent may be obtained for five cents each, by addressing the "Commissioner of Patents, Washington, D. C."